United States Patent [19]

Bové

[11] Patent Number: 4,679,643
[45] Date of Patent: Jul. 14, 1987

[54] CAPACITIVE WEIGHING DEVICE

[75] Inventor: Bertrand Bové, Wichelen, Belgium

[73] Assignee: Advanced Micro Electronic Components and Systems, Belgium

[21] Appl. No.: 820,548

[22] Filed: Jan. 17, 1986

[30] Foreign Application Priority Data

Jan. 21, 1985 [NL] Netherlands .................... 8500139

[51] Int. Cl.[4] .................... G01G 3/14; H01G 7/00; H01G 5/01
[52] U.S. Cl. .................... 177/210 C; 361/283; 361/288
[58] Field of Search ................ 177/210 C; 73/862.64; 361/283, 288

[56] References Cited

U.S. PATENT DOCUMENTS 4,084,438 4/1978 Lee et al. .................... 361/283 X
4,191,268 3/1980 Miyoshi et al. ................ 177/210 C
4,458,770 7/1984 Bucci .......................... 177/210 C Primary Examiner—George H. Miller, Jr.
Attorney, Agent, or Firm—Lyon & Lyon

[57] ABSTRACT

There is described a device, comprised of a frame or substructure, four arms arranged in cross shape or substantially in cross shape and hingedly supported on knife-edge in said frame, a weighing plate vertically movable relative to said frame, bearing through knife-edges on said arms, in notches provided therefor in the arms, in which said arms bear with the mutually-facing ends thereof on a box-design sensor, whereby the sensor capacity is changed proportionally to that force being exerted on said weighing plate, and in which said sensor is formed by a box-like holder with a bottom whereon a first insulated armature which acts as lowermost capacitive plate, is firmly secured.

7 Claims, 6 Drawing Figures

CAPACITIVE WEIGHING DEVICE

This invention relates to a capacitive weighing device comprised of a frame or substructure, four arms arranged in cross shape or substantially in cross shape and hingedly supported on knife-edges in said frame, a weighing plate vertically movable relative to said frame, bearing through knife-edges on said arms, in notches provided therefor in the arms.

The invention has for object to provide a capacitive weighing device which has on the one hand an extremely compact structure whereby the device is very strongly reduced in the height, and is fitted on the other hand with a capacitive sensor which makes possible the most accurate rendering of the weighing operations.

A capacitive weighing device working according to a similar capacitive principle is described in U.S. Pat. No. 4,458,770 to Bucci.

Said U.S. Patent describes a capacitive weighing device in which the structure of the sensor being used therein does not give the possibility to lower the weighing device height to the same rate as contemplated according to this invention. This is notably due to the capacitive sensor according to said Patent neutralizing the known hysteresis action which disadvantageously influences the weighing, by making use of such means that the weighing device height can not be lowered.

To obtain the object as defined hereinabove, said arms bear with mutually-facing ends thereof on a box-design sensor, whereby the sensor capacity is changed proportionally to that force being exerted on said weighing plate, whereby said sensor is formed by a box-like holder with a bottom whereon a first insulated armature which acts as lowermost capacitive plate, is firmly secured.

Still according to the invention, said box-like holder has four upstanding walls and a spring plate wherewith a second armature or capacitive plate is insulatedly connected.

A feature of the invention lies in said spring plate bearing with the one end thereof on an upstanding side of the box-like holder, and bearing with the opposite end thereof on a knife-edge which is retained in the vertical or substantially vertical position thereof relative to said box-like holder, due to said knife-edge or fulcrum being supported in two slots provided in the bottom, in such a way that during a weighing operation, said fulcrum may lightly swing and still form approximately the same angle with the spring plate bearing on said fulcrum or knife-edge.

In a possible embodiment of the invention, said upstanding side and said knife-edge are an integral part from said spring plate.

Other details and features of the invention will stand out from the following description, given by way of non limitative example and with reference to the accompanying drawings, in which.

Figure 3:
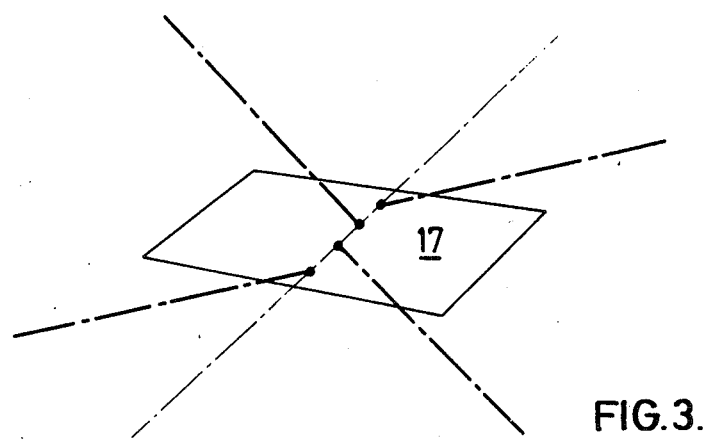

FIG. 3 diagrammatically shows the arrangement on a center line of four hinging arms.

Figure 4:
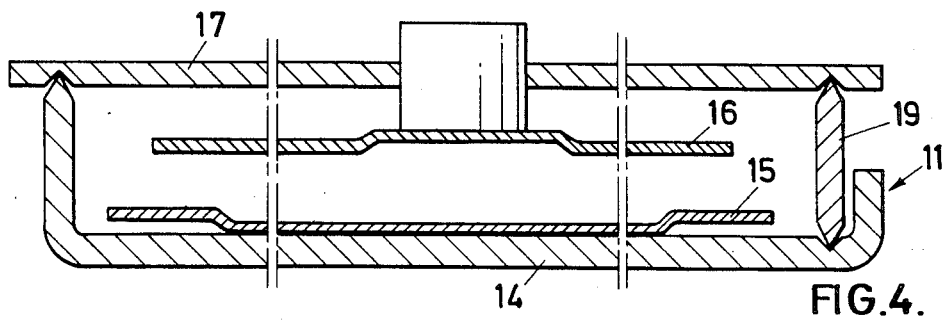
Figure 5:
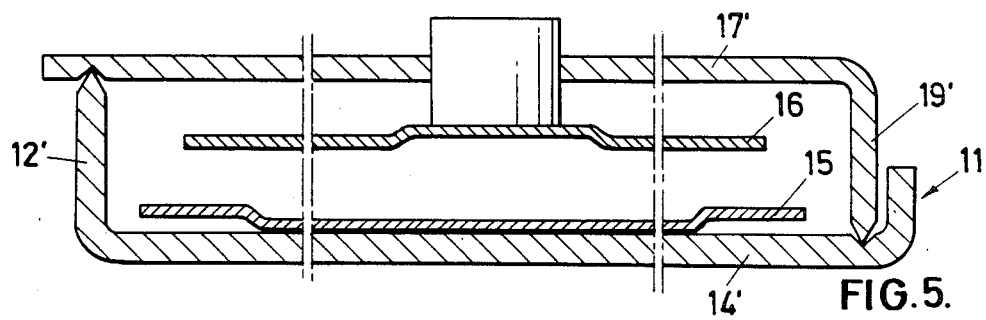
Figure 6:
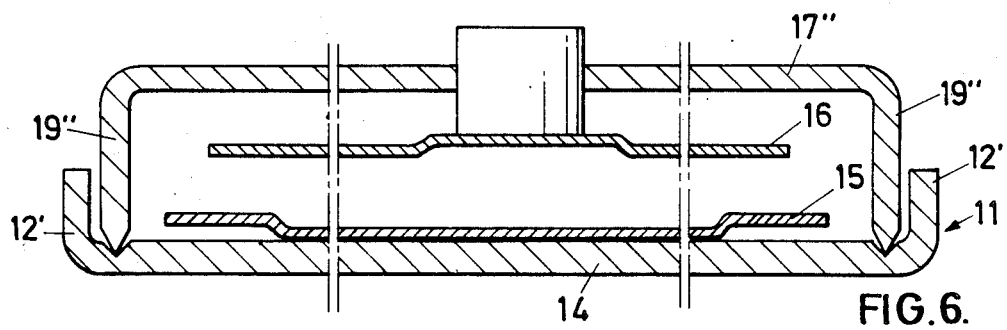

FIGS. 4, 5 and 6 diagrammatically show three possible arrangements of the spring plate relative to the bottom of the box-like holder.

The capacitive weighing device as shown in said figures comprises first of all a frame 1 which is preferably cast or injected in sythetic material, whereby this makes possible the making in a single operation, of a reinforcing lattice together with the bottom and upstanding walls of said component. In the center compartment 2 of frame 1, the capacitive sensor 3 is supported. On said capacitive sensor 3 which will be further described hereinbelow, four hinging arms 4 bear (the one thereof is raised out of the support thereof).

Figure 1:
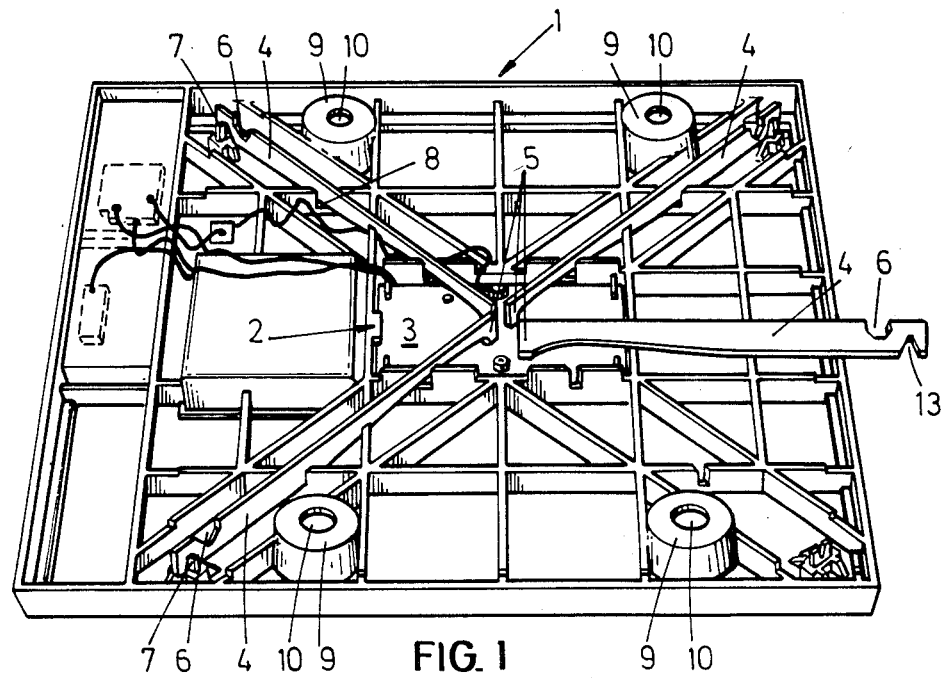
FIG. 1 is a perspective showing of the frame from the weighing device according to the invention, with the capacitive sensor built therein.

As it appears from FIG. 1, the hinging arms 4 are formed by oblong metal strips which bear on the one hand with the ends 5 thereof, on the capacitive sensor 3, and have on the other hand on the opposite end, a notch 13 wherewith each said arms bears on a knife-edge or fulcrum 7. Said fulcrum 7 is built-in in frame 1. The weighing plate not shown, bears in four points with four depending knife-edges or fulcrums on said arms 4. Four V-shaped recesses 6 are provided therefor on arms 4. In said V-shaped recesses the weighing plate bears through knife-edges bearing in the recesses 6.

The four ends 5 bear on the capacitive sensor 3 in the center area thereof. It is also possible to receive the four ends 5 from arms 4 in a common centering part or cup. There is obtained thereby a single engagement point on sensor 3.

For the movements thereof in vertical planes, each one of said hinging arms 4 is guided in notches 8 provided therefor in the lattice of frame 1.

The weighing plate not shown is guided in four points during the vertical displacement thereof relative to frame 1. Guideways therefor may be formed by four elements 9 each having a center vertical boring 10. This allows exerting a pre-determined prestressing on sensor 3, whereby tolerance variations in the various components are balanced out.

Due to such a structure, a very compact weighing device may be provided, which is mostly noticeable by the low height of frame and weighing plate. As the four hinging arms act with the projections 5 thereof in a concentrated area of sensor 3, such a compact weighing device structure is possible, combined with a high accuracy.

Figure 2:
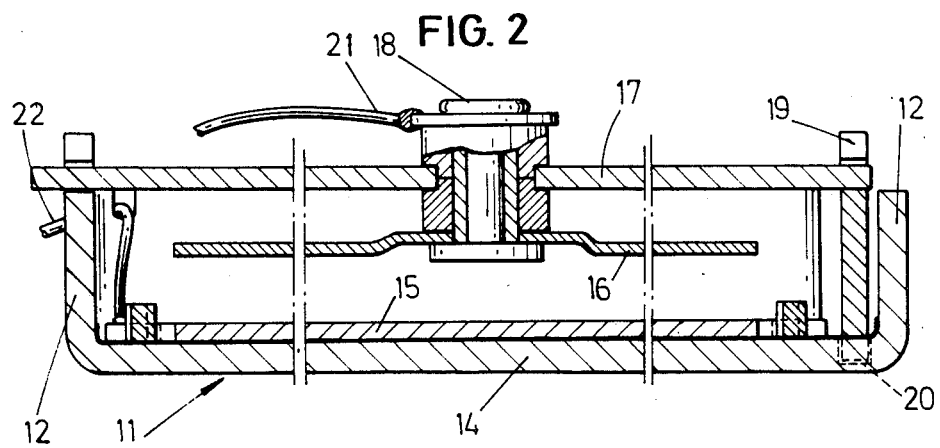
FIG. 2 is a lengthwise cross-section on another scale, of the capacitive sensor according to the invention.

The capacitive sensor 3 which will now be described with reference to FIG. 2, is comprised of a box-like holder 11 with four upstanding walls. Among these sides, the small cross-wise sides 12 are visible in the figures. On the holder bottom 14, a first capacitor armature is provided, and actually in the shape of a thin insulated metal plate 15. A second armature is formed by the uppermost capacitive plate 16, which may be designed in the same way as the first armature.

The capacitive plate 16 is connected to the spring plate 17 through two insulating rivets 18. The four hinging arms 4 thus press on said spring plate 17.

With a weighing operation, the spring plate 17 is pressed downwards and the plate 16 forming the second capacitor armature is also moved downwards thereby, whereby the spacing between the first armature or plate 15 and the second armature or plate 16 is changed, with the result that a measuring may be made due to the capacitive phenomenon, in a known way.

With the one end thereof, the spring plate 17 bears on the top edge from a small side 12, while said same plate 17 bears with the other end thereof on a knife-edge or fulcrum 19, which is retained in the vertical or substantially vertical position thereof due to said knife-edge 19 being supported in two slots 20 provided facing one another in the bottom. The pertaining end of said spring plate 17 is moved in this way for a measuring, not along the top edge of a side 12, but said plate remains lying orthogonally or substantially orthogonally relative to knife-edge 19, which slightly swings along with the weighing operation. In this way, notably hysteresis phenomenons are neutralized.

To be complete, two connectors 21 and 22 are shown in FIG. 1. Said connectors lead to electric and electronic apparatus which fulfill treatment operations known per se, but which are designed as a number specific monolithic integrated circuits, which notably compensate for non-linear and temperature-dependent factors inherent in the present invention.

The spring plate 17 may be designed together with knife-edge or fulcrum 19, in various embodiments. The above-described embodiment has the spring plate 17 bearing with the one end thereof on a small side 12 from the box-like holder, and bearing with the other end thereof on a knife-edge 19. The knife-edge 19 then bears on the bottom 14. This is substantially the embodiment as shown in diagrammatic FIG. 4.

As shown in FIG. 5, the one end of spring plate 17 is bent over into a "knife-edge" 19' in such a way that spring plate and knife-edge form a single unit. The bottom 14' forms with the one side 12', a knife-edge proper.

Finally the spring plate 17" may form an unit with two knife-edges 19" (FIG. 6). In this figure, the small sides from the box-like holder 11 with bottom 14", are shown in 12".

It is clear that the invention is not limited to the above embodiments and that many changes might be brought thereto without departing from the scope of the invention, as defined by the appended claims.

I claim:

1. Capacitive weighing device, comprised of a frame or substructure, four arms arranged in cross shape or substantially in cross shape and hingedly supported on knife-edges in said frame, a weighing plate vertically movable relative to said frame, bearing through knife-edges on said arms, in notches provided therefor in the arms, in which said arms bear with the mutually-facing ends thereof on a spring plate, wherewith an armature or upmost capacitive plate is insulatedly connected, said spring plate bearing with the one end thereof on one upstanding side from a box-like holder with a bottom whereon a metal film which acts as a lowermost capacitive plate is insulatedly fixed, and bearing with the opposite end thereof on an upstanding knife-edge, said knife-edge being supported in two slots provided in the bottom, in such a way that during a weighing operation, said knife-edge may slightly swing and always form substantially the same angle with the spring plate bearing on said knife-edge.

2. Capacitive weighing device as defined in claim 1, in which said upstanding side and said knife-edge comprise an integral part of said spring plate.

3. Capacitive weighing device as defined in claim 1 or 2, in which said spring plate bears on said knife-edge through the use of a knife seat.

4. Capacitive weighing device as defined in any one of claims 1–3 in which said knife-edge bears by means of a knife seat in said slots.

5. Capacitive weighing device as defined in any one of claims 1–4, in which the upstanding side and said knife-edge are integral with said spring plate.

6. Capacitive weighing device as defined in any one of claims 1–5, in which said spring plate forms a single unit with said knife-edge.

7. Capacitive weighing device as defined in any one of claims 1–5, in which said spring plate is machined along both sides to a knife-edge wherewith said spring plate bears on the bottom.

* * * * *